United States Patent [19]
Diaz

[11] Patent Number: 5,385,623
[45] Date of Patent: Jan. 31, 1995

[54] METHOD FOR MAKING A MATERIAL WITH ARTIFICIAL DIELECTRIC CONSTANT

[75] Inventor: Rodolfo E. Diaz, Phoenix, Ariz.

[73] Assignee: Hexcel Corporation, Pleasanton, Calif.

[21] Appl. No.: 890,757

[22] Filed: May 29, 1992

[51] Int. Cl.⁶ .............................................. B32B 31/00
[52] U.S. Cl. ........................... 156/197; 156/272.2; 156/277; 156/278; 343/911 R; 342/4; 428/118
[58] Field of Search .................. 343/911 R; 156/197, 156/272.2, 277, 278; 342/1-4; 428/118, 116

[56] References Cited

U.S. PATENT DOCUMENTS

| | | | |
|---|---|---|---|
| 2,668,327 | 2/1954 | Steele | 156/197 |
| 2,985,880 | 5/1961 | McMillan | 342/4 |
| 3,466,957 | 9/1969 | Anderson et al. | |
| 3,470,053 | 9/1969 | Rule | |
| 3,598,676 | 8/1971 | Noble | |
| 3,754,271 | 8/1973 | Epis | 343/743 |
| 3,886,558 | 5/1975 | Cary et al. | 342/437 |
| 3,887,920 | 6/1975 | Wright et al. | 343/18 A |
| 4,921,745 | 5/1990 | Mitsui et al. | 156/197 |
| 5,095,311 | 3/1992 | Sajiki et al. | 342/4 |
| 5,214,432 | 5/1993 | Kasevich et al. | 342/4 |
| 5,217,556 | 6/1993 | Fell | 156/197 |
| 5,224,249 | 7/1993 | Kornely, Jr. | 156/197 |

OTHER PUBLICATIONS

Plessey Microwave Brochure, San Diegeo, California.

*Primary Examiner*—Chester T. Barry
*Attorney, Agent, or Firm*—Townsend & Townsend Khourie and Crew

[57] ABSTRACT

A method for making a material with an artificial dielectric constant is carried out by choosing the desired dielectric constant for a particular electromagnetic field, selecting a substantially non-electrically conductive sheet material (2) from which the cellular core material (26) is to be made, applying an electrically conductive material (8) to selected areas on the sheet material and thereafter forming a cellular core material from layers of the sheet material having the conductive material already applied thereto.

21 Claims, 6 Drawing Sheets

METHOD FOR MAKING A MATERIAL WITH ARTIFICIAL DIELECTRIC CONSTANT

BACKGROUND OF THE INVENTION

A dielectric material is a material which, when in the presence of electric field, stores more energy than is stored in free space. That is, the dielectric material stores electrical potential energy inside itself. Many common materials, such as glass and epoxies, act as dielectrics.

This ability of the dielectric is commonly expressed in terms of permittivity. The permittivity for free space is identified as $\epsilon_o$ while relative permittivity for a material, unitless, is identified as $\epsilon_r$ and is equal to the ratio of permittivity of the material to the permittivity of free space. The relative permittivity for air is approximately equal to 1. For purposes of this application, permittivity means relative permittivity unless otherwise indicated.

In the presence of time varying electric fields a dielectric dissipates a portion of its stored energy as heat. This loss is indicated by assigning the permittivity real and imaginary parts for the special case of steady state sinusoidally varying fields.

Thus the complex permittivity is defined by the following equation:

$$\epsilon_r = \epsilon' - j\epsilon'', \text{ where } j = \sqrt{-1}.$$

These real and imaginary parts are in general functions of the frequency ($\omega$) so that the permittivity is better expressed as the following:

$$\epsilon_r(\omega) = \epsilon'(\omega) - j\epsilon''(\omega), \text{ where } j = \sqrt{-1}.$$

Figure 1:
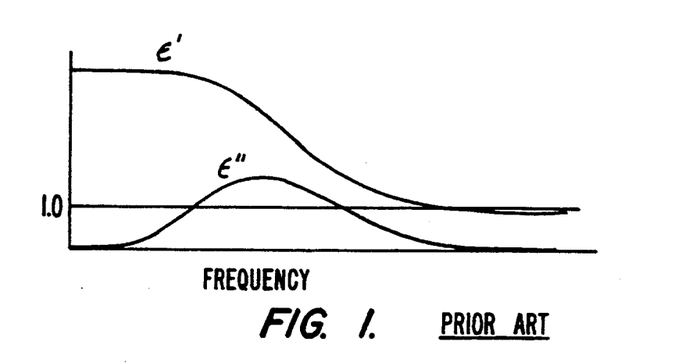
FIG. 1 plots the real and imaginary parts of permittivity as a function of frequency for a typical lossy dielectric.

See FIG. 1 for a plot of $\epsilon(\omega)$ as a function of frequency for a simple material. It is seen that as frequency increases, $\epsilon'$ attains the value of 1, that is the permittivity of free space, while $\epsilon''$ has one or more peak values at special frequencies. The imaginary part of the permittivity, $\epsilon''$, acts like the first derivative of $\epsilon'$. That is, where the rate of change of $\epsilon'$ is the greatest, $\epsilon''$ peaks to provide what is called an absorption band.

One of the uses for dielectric materials is in the form of lenses to increase the amount of power that an antenna can collect. Such lenses work because electromagnetic radiation travels slower in the lens than in free space and thus bends. A lens, to be effective, must have a diameter greater than two times the wave length ($\lambda$) of the electromagnetic radiation. Since the wave length equals the speed of light divided by the frequency, at a frequency of, for example 200 MHz, the wave length will be about 5 feet. Therefore, extremely large lenses are required at radio frequencies. This makes the use of natural dielectrics, such as glass and epoxies, impractical for radio frequency lens applications because of their weight. To overcome this obstacle investigators in the late 1940's and 1950's demonstrated that artificial dielectric materials could be made.

One type, termed metallic delay media, can be made of sheets of foam material with flat metal squares fixed to at least one of the surfaces, the metal squares being separated from one another. See S. B. Cohn, "The Electric and Magnetic Constants of Metallic Delay Media Containing Obstacles of Arbitrary Shape and Thickness", J. of App. Phys. Vol. 22, No. 5, May 1951 pp. 628–634, the disclosure of which is incorporated by reference. The pieces of foam with the metal squares are then stacked and secured together to obtain a lightweight dielectric. The material can be shaped to create a lens to cause concentration of an electromagnetic wave passed through the material.

These materials behave in a manner similar to a resistor capacitor inductor (RCL) circuit. Thus, by minimizing the resistance of the obstacles a very low loss dielectric can be made. Near the frequency where the obstacles are one half wavelength long, the material behaves as a resonant LC circuit causing the permittivity to be strongly frequency dependent. When this effect is undesirable, the obstacles are made very small, effectively pushing the material resonance outside the desired band of operation. On the other hand, if a designer makes a prism having a dielectric constant which changes rapidly with frequency (and thus with wavelength), a single transmission can be separated in space into its individual frequencies. That is, the signal can be multiplexed. In communication this is quite useful since the more frequencies available, the more information can be transmitted.

Because the early applications of artificial dielectrics were for the purpose of enhancing the transmission of energy, the greatest concern was in obtaining a controlled real part of the permittivity $\epsilon'$. The control of $\epsilon''$ came with the need to absorb or attenuate electromagnetic waves.

In its simplest form such a material starts with a host material into which a "lossy" material, like carbon, is introduced and dispersed throughout the volume. This type of dielectric material is termed an absorber.

The permittivity of this type of material is in general frequency dependent and unpredictably so. Even very fine particles of carbon tend to make tiny chains or groups of carbon particles within the host material. The tiny chains are separated by gaps creating a multitude of RC circuit analogs. Because of this tendency, the final complex permittivity is influenced by the amount of carbon present and is sensitive to the process used in making the material. The carbon can align, segregate or clump at random. These random effects reduce the repeatability of these materials and frequently lead to unplanned anisotropic properties. (Materials with anisotropic properties exhibit different dielectric properties depending upon the direction of the electric field.) Therefore, the making of an isotropic (essentially equal dielectric properties in all directions) material using microscopically sized carbon particles by randomly scattering it throughout the volume is undesirable from a manufacturing reliability standpoint.

Figures 2, 2A:
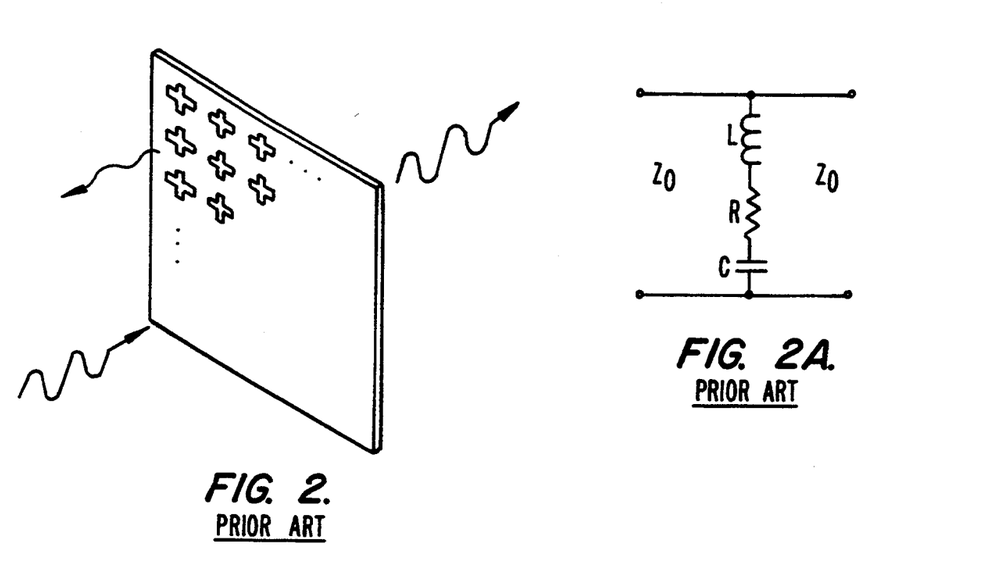
FIG. 2 is a simplified view illustrating a single sheet of plastic having a number of, for example, cross shaped elements against which a wave is projected so that some radiation is transmitted, some is absorbed and some is reflected.
FIG. 2A shows how this sheet of FIG. 2 acts in a circuit analog manner as an LRC series circuit.

A different approach to electromagnetic wave absorption is embodied in circuit analog absorbers. FIG. 2 illustrates a single sheet of plastic having a number of cross shaped elements against which a wave is projected. The sheet acts in the manner shown in FIG. 2A; that is, as an RCL series circuit where the resistance is determined by the conductivity of the elements, the capacitance is determined by the spacing and size of the elements, and the inductance depends on the size, width and shape of the elements.

Figure 2B:
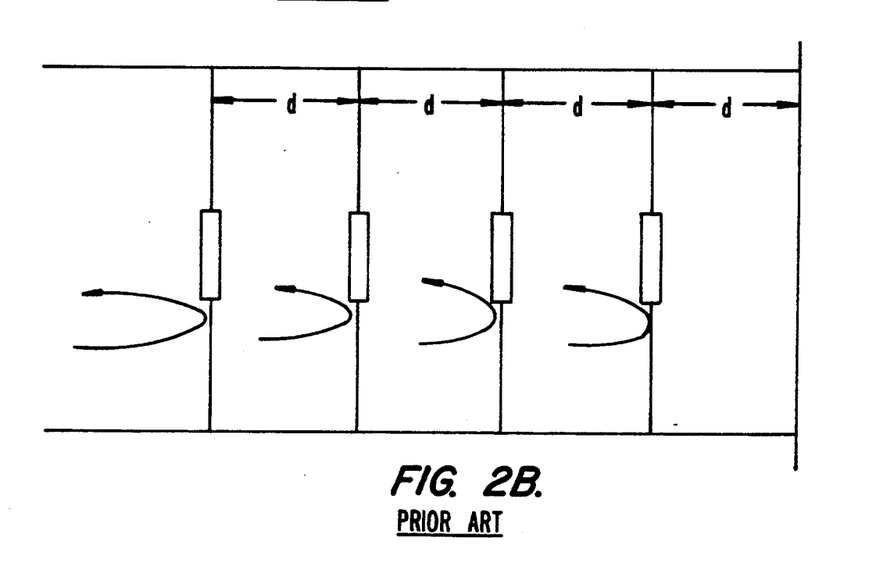
FIG. 2B shows how a number of the sheets of FIG. 2 could be stacked at precise spacings equal to one-half the wave length to achieve absorption over a broad band of frequencies.

In the embodiment of FIG. 2, part of the wave is reflected, part passes through and part is dissipated within the material. Using this principle, a circuit analog absorber can be designed by stacking a precise number of sheets with specific properties at precise spacings as show in FIG. 2B. In this case the distance d between the sheets is equal to one half the wave length. With this arrangement, the multiple reflections between the wave and the various sheets are precisely balanced with the impedance of each sheet to obtain absorption over a broad band of frequencies.

SUMMARY OF THE INVENTION

The present invention is directed to a method for making a material with an artificial dielectric constant. The invention allows the material designer to construct electromagnetic absorbers with tailor-made electromagnetic properties. In addition to conventional control of conductivity profile, control of the frequency dependent permittivity of the material can be achieved independently along all three principal axes of the material. The invention thus has particular advantages for use with anechoic chambers, compact range absorbers, absorbers used to eliminate electromagnetic interference between neighboring telecommunication devices and absorbers for reducing the deleterious effects of nearby structures on antennas.

The method is carried out by selecting the desired dielectric constant, typically between about 1.03 and 20., for a particular electromagnetic field. A substantially non-electrically conductive sheet material, from which the material is to be made, is chosen. An electrically conductive material is then applied to selected areas on the sheet material. After such application, a cellular core material is formed from layers of the sheet material having the conductive material already applied thereto.

Presently, loaded conducting foams or similar materials, typically having finely divided carbon mixed throughout the material, are used to attenuate unwanted electromagnetic signals. However, the material properties are not tuned to the frequencies of interest. Only the conductivity profile and the material thickness are varied in an attempt to meet the requirements. However, these two variables are not enough to obtain a compact, higher performance material for the application.

One of the primary advantages of the invention is that it permits the designer much more latitude in the physical construction of various absorbers. For example, conventional low frequency (VHF-UFH) and anechoic chamber absorbers are made with pyramids of absorbing foam as much as two meters tall. With the present invention, using materials which are tuned to the various frequency needs, the size of the resulting absorbent structure can be significantly reduced.

In addition to control of the permittivity's frequency dependence, its isotropy can also be controlled. Therefore, the invention is ideally suited for use with spiral antennas. Spiral antennas are often used in communication for access to broadband frequencies for both receiving and transmitting purposes. Such antennas are also used for nondestructive testing where they are used to emit and receive broadband frequency pulses.

Other features and advantages will appear from the following description in which the preferred embodiments have been set forth in detail in conjunction with the accompanying drawings.

DESCRIPTION OF THE PREFERRED EMBODIMENT

The present invention is described with reference to three different embodiments, all of which are made using sheets of material which are formed to create an expanded honeycomb core type of cellular core material.

Figure 3:
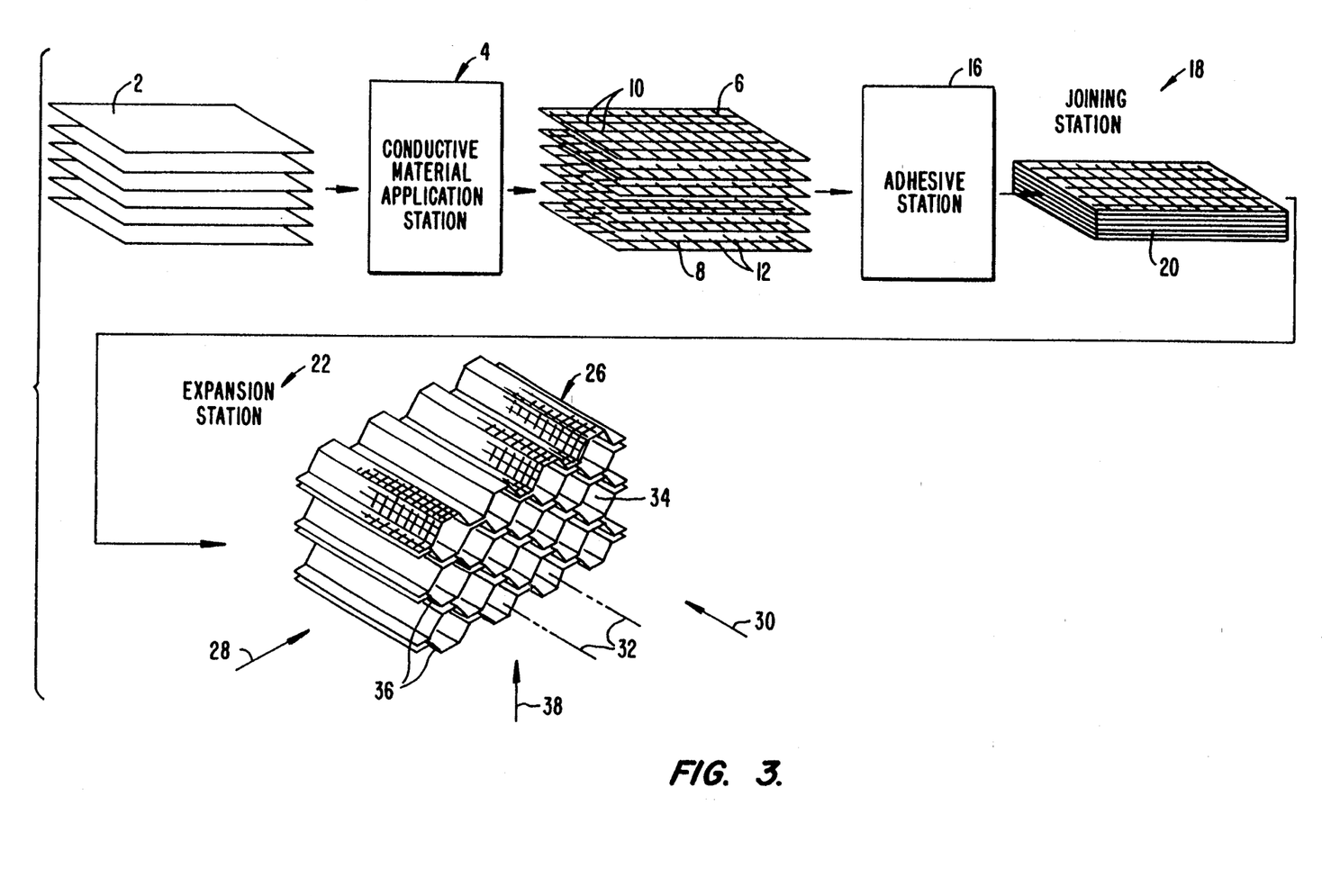
FIG. 3 is a simplified schematic view suggesting one method for manufacturing a honeycomb type core material made according to the present invention.

FIG. 3 schematically illustrates one way to make honeycomb type cellular core material. Conventional methods for making honeycomb core material are described in more detail in U.S. Pat. Nos. 3,470,053 and 3,598,676, the disclosures of which are incorporated by reference. Briefly, sheets of material 2 are used to create the honeycomb type core material. Material 2 is preferably a resin-impregnated fabric type of material, typically made of woven or felted fabric impregnated with a phenolic resin. The fabric can be made of glass fibers, quartz fibers, ceramic fibers, polymer fibers such as aramid, or any other suitable material. Suitable fabric can be purchased from DuPont Corp. of Wilmington, Del. as Nomex ® brand aramid fibers. Other manufacturers of suitable fibers include Clark Schuebel, Owens Corning, J. P. Stevens and Allied Signal.

Sheets 2 then pass through a conductive material application station 4 which applies, in this first embodiment, a grid pattern 6 (shown greatly enlarged in FIG. 3 for sake of clarity) of an electrically conductive material 8. Material 8 typically includes finely divided carbon as the conductive element suspended within a carrier fluid which evaporates after being applied to sheets 2. An example of a suitable material is carbon loaded inks made by Olin Hunt Specialty Products Inc. of West Patterson, N.J. Various other types of conductive inks can be used as well. The application of electrically conductive material 8 to sheets 2 is preferably done by the rotogravure process, but can be accomplished by various other conventional processes including silk screening, ink jet printing, lithographic printing and flexographic printing as is shown in the art. Grid pattern 6, shown in more detail in FIG. 4A, includes first and second sets 10, 12 of parallel, spaced apart grid elements 14.

Sheets 2, with electrically conductive material 8 applied thereto, then pass an adhesive station 16 at which a suitable adhesive is applied to one or more opposed surfaces of sheets 2. Sheets 2 are then placed one on top of the other at a joining station 18. The joined stack 20 of sheets 2 then pass an expansion station 22 to create an expanded honeycomb type cellular core material 26 having electrical properties created by electrically conductive material 8. Alternatively, sheets 2 could be corrugated and then bonded together to create the honeycomb structure.

Figure 4A:
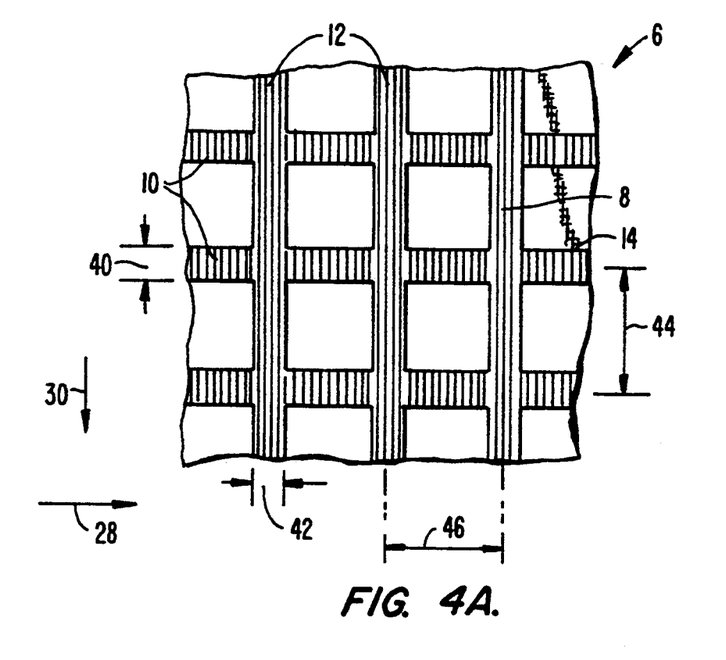
FIG. 4A is an enlarged view of the grid pattern of FIG. 3.

Grid elements 10 are oriented in the L (for length) direction 28 while the elements 12 are oriented in the T (for thickness) direction 30. T direction 30 lies parallel to the axes 32 created along interiors 34 of the honeycomb cells 36. Directions L and T are perpendicular to one another. The W (for width) direction 38 is oriented generally perpendicular to the surfaces of sheets 2 and perpendicular to directions 28, 30.

Elements 10 have a width 40 while grid elements 12 have a width 42. Elements 10, 12 define a unit cell length 44 in T direction 30 and a unit cell length 46 in the L direction 28. In the preferred embodiment widths 40, 42 are both about 0.02 inch to 0.10 inch while unit cell lengths 44, 46 range from about 0.02 inch to 0.30 inch.

The object with this embodiment is to use the control afforded by line widths and line spacings to achieve a sheet loss that is X for an electric field aligned with the T direction 30 and, for example, 2X for an electric field aligned with L direction 28. This can be accomplished in a number of ways.

Figure 4B:
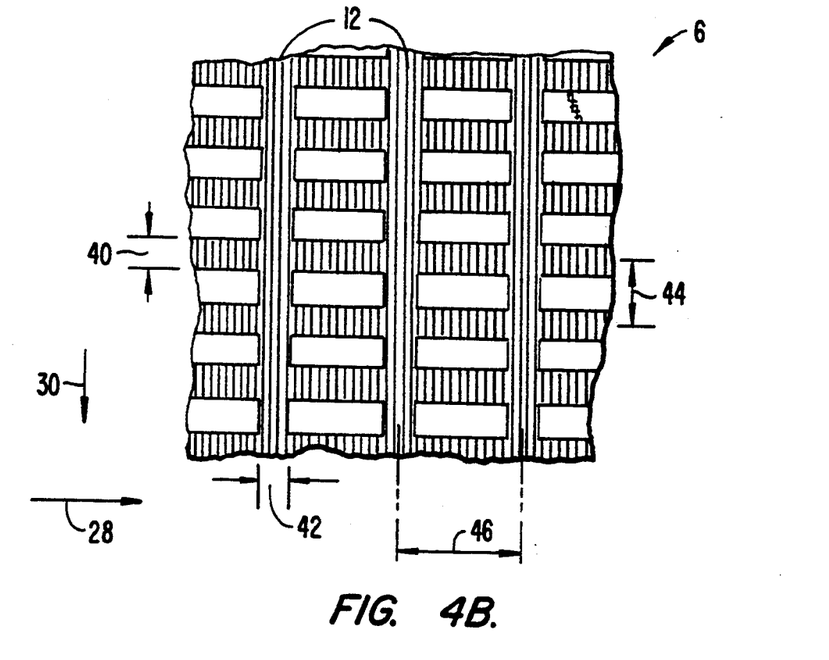
FIG. 4B is a view of the grid pattern in which cell dimension 44 is half that of cell dimension 46.

First, let line widths 40, 42 and line conductivities be equal. Make unit cell lengths 44, 46 be 0.1 inch and 0.2 inch, respectively, so that cell length 46 is twice cell length 44 as illustrated by FIG. 4B. This makes the resistance per unit cell twice as large for an electric field aligned with T direction 30 as for an electric field aligned with L direction 28 to achieve a greater conductivity in the L direction by a two to one margin.

A second way to achieve the two to one (or other) conductivity ratio is to leave line widths 40, 42 the same and unit cell lengths 44, 46 the same. However, line conductivity in the L direction 28 can be made to be twice that in T direction 30. This can be achieved in various ways. Two different types of electrically conductive material 8, one with twice the conductivity as the other, can be applied. Another way is to apply material 8 twice as deep or thick in L direction 28 as in T direction 30 so that the electric field in L direction 28 sees twice the conductivity, and thus twice the loss, as in T direction 30.

Figure 4C:
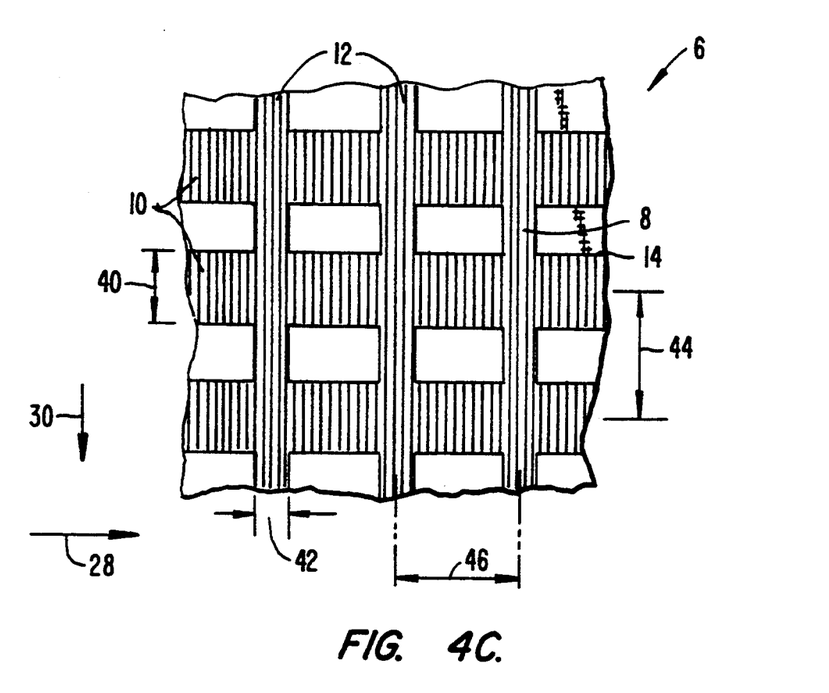
FIG. 4C is a view of the grid pattern in which the width of line 40 is twice that of line 42.

A third way for achieving the two to one ratio of sheet loss in the L and T directions is by leaving the unit cell lengths 44, 46 equal, the line depth or thicknesses the same but make the L direction line width 40 be twice the T direction line width 42 as illustrated by FIG. 4C. Since line widths 42 of grid elements 12 will then be thinner than line width 40 of grid elements 10, an electric field oriented in T direction 30 will see the thinner, and thus less lossy, line widths 42 than an electric field direction in L direction 28 which sees thicker line widths 40. Also, a combination of these three methods can be used as well.

Being able to easily and simply adjust the loss characteristics in this manner, the overall loss characteristics for cellular core material 26 can be easily and simply adjusted.

Cellular core material can be created from sheets of material which are uniformly preloaded with a conductive material. Such core materials generally exhibit anisotropic behavior since they have different loss characteristics depending upon whether the electric field is in the L, T or W directions. In some situations isotropic (equal loss characteristics in all three dimensions) behavior is desired. The present invention is quite suitable for those situations as well, since the sheet anisotropy can overcome certain anisotropy due to cell geometry as is discussed below.

Figure 3A:
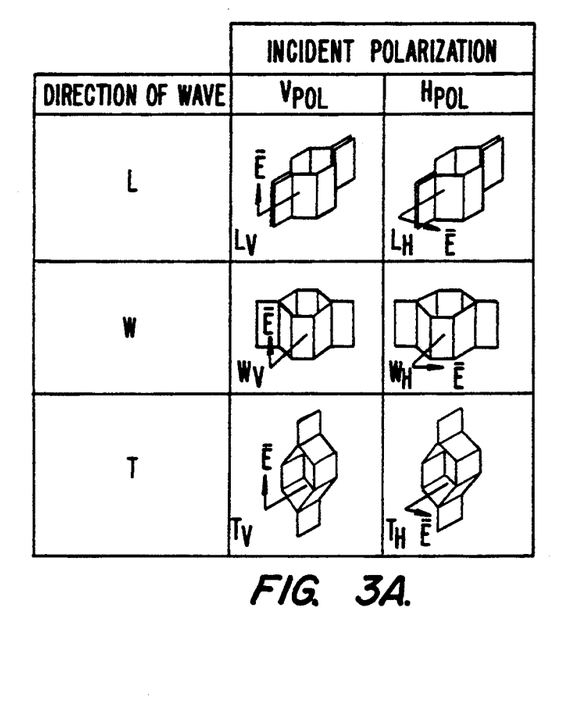
FIG. 3A illustrates the six different combinations of electric field polarization and wave direction for the artificial dielectric made of hexagonal cells according to the invention.
Figure 3B:
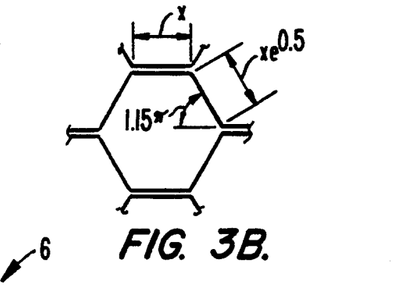
FIG. 3B illustrates a preferred hexagonal cell geometry for use with the present invention.

FIG. 3B illustrates a preferred cell geometry for a hexagonal-shaped cellular core element 48 for use with all three preferred embodiments of the present invention. This cell geometry produces a 2:1 anisotropy (between T and L polarizations of the electric field) when made with sheets which had been uniformly loaded (typically by coating the sheets) with a conductive material prior to being formed into honeycomb core element 48. That is, the losses generated from an electric field in L direction 28 are about equal to the losses generated by the same electric field in W direction 38 and about 50% of the losses generated in T direction 30. To create 3-D isotropy using core 48 and grid pattern 6, widths 40, 42 are kept equal to one another while length 46 is about 2.0 to 2.5 times length 44; this yields sheet anisotropy of that same order.

The determination of the required sheet anisotropy to obtain a given core anisotropy is made by solving the following boundary value problem using a numerical electromagnetics computer code (Finite Difference LaPlace Equation Solvers is an example).

Figure 3C:
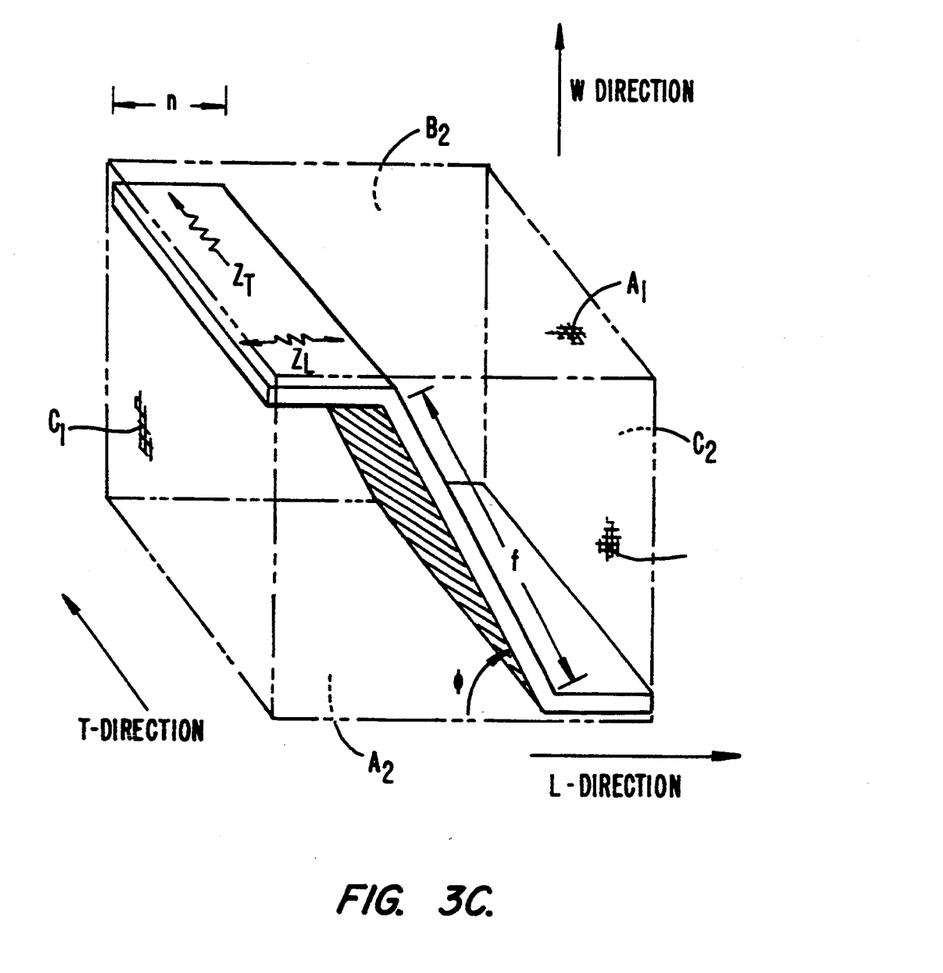
FIG. 3C is an idealized view of the smallest periodic unit of sheet in the core geometry shown in FIG. 3B.

(1) Consider the smallest periodic unit of sheet in the final core geometry. It will correspond to a "Z" shaped sheet embedded in a cubical volume as illustrated in FIG. 3C.

(2) Assume this sheet is anisotropic so that its impedance in the T direction ($Z_T$) is not equal to the impedance in the L direction ($Z_L$).

(3) For the desired core dimensions, n, f and $\Phi$, solve the following three problems:
  (a) Make the walls of the cube labelled $A_1$ and $A_2$ be perfect electric conductors. Make walls $B_1$, $B_2$, $C_1$ and $C_2$ be perfect magnetic conductors. Apply a potential difference (V) between walls $A_1$ and $A_2$, at a frequency $\omega$. Measure the complex current (I) flowing from wall $A_1$ to $A_2$. Calculate the complex admittance of the cube Y=I/V. The ratio of this admittance to the admittance in the absence of the conducting sheet gives the effective dielectric constant of the material for the electric field in the W direction.

(b) Repeat (a) but make walls $B_1$ and $B_2$ perfect electric conductors and walls $A_1$, $A_2$, $C_1$ and $C_2$ perfect magnetic conductors. Apply the potential difference between $B_1$ and $B_2$. The ratio of admittances gives the effective dielectric constant for an electric field in the T direction.

(c) Repeat (a) but make walls $C_1$ and $C_2$ perfect electric conductors; make walls $B_1$, $B_2$, $A_1$, $A_2$ perfect magnetic conductors. The dielectric constant for electric field in L direction is obtained.

(4) Vary the ratio $Z_T/Z_L$ and repeat the calculations until the dielectric constants achieve the desired ratios. A non-linear optimization can be performed to find these values of $Z_T$ and $Z_L$ quickly.

The above-described embodiment, using the grid of FIG. 4A, is relatively frequency (and thus wave length) nonspecific. The following two examples are frequency specific.

Figure 5:
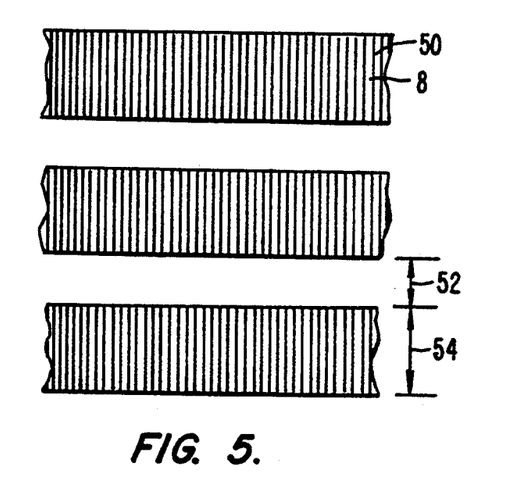
FIG. 5 shows a second pattern of electric conductive material according to a second embodiment of the invention.

FIG. 5 illustrates a second embodiment in which electrically conductive material 8 is applied to sheets 2 using a series of parallel, conductive elements 50 spaced apart by a gap length ($G_L$) 52. Each conductive element 50 has an element width 54, an indeterminate length in the other direction and a periodic unit ($C_L$) determined by the sum of gap ($G_L$) 52 and element width 54. The ratio of gap length 52 to element width 54 controls the maximum obtainable excess permittivity as follows:

$$\epsilon_{excess} = \frac{2\,C_L}{\pi\,a} \ln\left( \csc\left[ \frac{\pi}{2} \; \frac{G_L}{C_L} \right] \right)$$

where a is the average periodicity of the array (distance between sheets 2 in W direction 38) in the cellular core material. Typically this is in the range of 0.1 to 20. The $\epsilon''$ loss is then less than or equal to $\epsilon_{excess}/2$ and occurs at a frequency given by:

$$\frac{1}{2\pi} \; \frac{\sigma_{medium}}{\epsilon_{excess}}$$

where $\sigma_{medium}$ is the effective conductivity of the core material due to the deposited conductive material 8 which is aligned with the electric field. Therefore $\epsilon''$ has a prescribed frequency dependence similar to that sketched in FIG. 1. By aligning conductive elements 50 with the L direction 28 or T direction 30, the resulting core will exhibit this frequency dependent permittivity (also called circuit analog behavior) in the pair ($L_v$, $W_v$) or quad ($T_h$, $T_v$, $L_h$, $W_h$) directions respectively. See FIG. 3A which illustrates the six different combinations of electric field directions and polarizations. Thus, circuit analog behavior can be independently controlled in the pair direction ($L_v$, $W_v$) and in the quad direction ($T_h$, $T_v$, $L_h$, $W_h$).

Whereas cell geometry may be aligned along a given direction in the structure to meet mechanical requirements, the preferred electrical properties can be oriented along other axes. Thus, the electrical and mechanical designs are separated, giving more degrees of freedom for the particular application.

Figure 6:
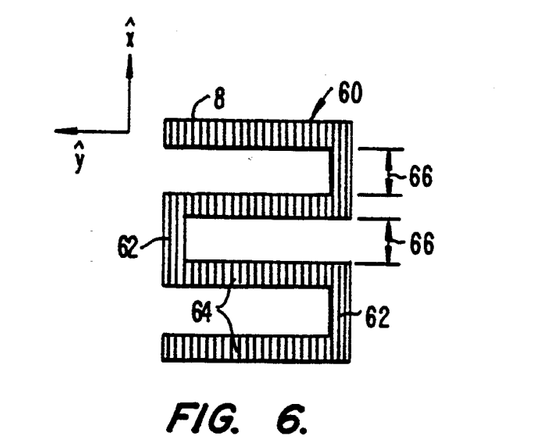
FIG. 6 shows a third embodiment of the invention in which electrically conductive material is applied to the sheets in an undulating, generally M-shaped pattern.
Figure 6A:
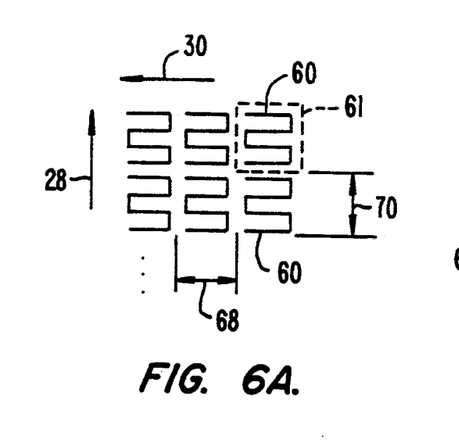
FIG. 6A shows a set of six of the undulating conductive elements of FIG. 6 arranged in array to illustrate the cell lengths.

FIGS. 6 and 6A illustrate a further embodiment of the invention including an undulating, generally M-shaped conductive elements 60 separated from one another in a regular pattern or array of cells 61 as shown in FIG. 6A. Each element 60 has vertical and horizontal lines 62, 64, horizontal lines 64 being separated by gaps 66. Each element 60 is separated from each other element 60. Each repeating cell 61 has a horizontal cell length 68 and a vertical cell length 70. By controlling the size of gaps 66, the lengths of lines 62, 64, the cell lengths 68, 70 and the conductivity of electrically conductive material 8, the electrical behavior in L and T directions 28, 30 can be made as different as desired.

Figure 6B:
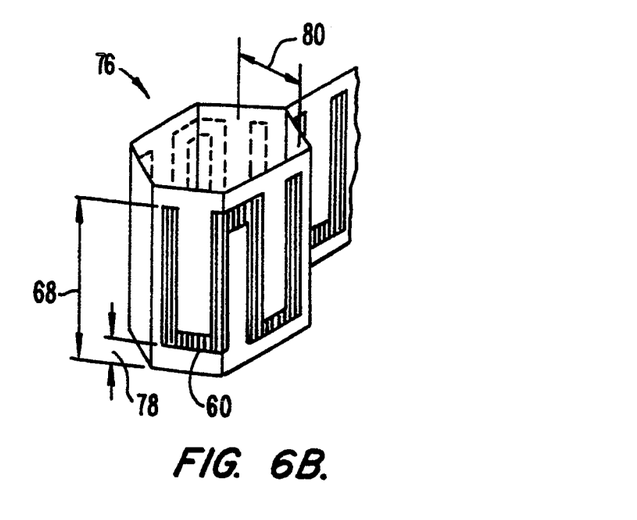
FIG. 6B shows a hexagonal cell with the undulating pattern of FIG. 6.

FIG. 6B illustrates a cell 76 incorporating undulating conductive element 60 thereon. Cell 76 has an element-to-element gap 78 and average separation 80. The following equation provides a simple rule of thumb model for this configuration where average separation 80 is a, vertical periodic unit 68 is b, and element-to-element gap 78 is b'.

$$\epsilon_{excess} \approx \frac{2b}{\pi a} \ln\left( \csc\left[ \frac{\pi}{2} \; \frac{b'}{b} \right] \right) \times 1.065$$

When a equals 0.113, b equals 0.240 and b' equals 0.024, $\epsilon_{excess}$ equals 2.67. Therefore, $\epsilon'_{dc}$ equals 3.67 and $\epsilon''_{peak}$ is less than or equal to 1.34.

This indicates that high values of $\epsilon''$ with a prescribed frequency dependence can be obtained in cores. This behavior, also called circuit analog behavior, can be different for different polarizations.

Rotating the undulating pattern to align it with L direction 28 rather the T direction 30 of the core can also yield an approximately 3-dimensional isotropic material.

Modification and variation can be made to the disclosed embodiments without departing from the subject of the invention as defined in the following claims.

What is claimed is:

1. Method for making a material with a first frequency dependent complex permittivity along a first principal axis, a second frequency dependent complex permittivity along a second principal axis, and a third frequency dependent complex permittivity along a third principal axis, said method comprising the following steps:

choosing a frequency of interest for each principal axis;

choosing a polarization for a wave of interest relative to each principal axis;

determining the frequency dependent complex permittivity along each principal axis such that the wave of interest for the chosen polarization encounters the desired frequency dependent complex permittivity;

designing a pattern and a cellular core structure in which the dimensions, geometry and conductivity characteristics of the pattern and the dimensions and the geometry of the cellular core structure are chosen to achieve the desired frequency dependent complex permittivity along each principal axis;

selecting a substantially non-electrically conductive sheet material;

applying an electrically conductive material to the sheet material according to said pattern design; and thereafter forming a cellular core structure from layers of the sheet material according to said cellular core structure design, said structure defining said first principal axis, said second principal axis, and said third principal axis.

2. The method of claim 1 wherein the selecting step is carried out by selecting sheets of resin impregnated fabric.

3. The method of claim 2 wherein the resin impregnated fabric is made of woven or felted fabric impregnated with a phenolic resin.

4. The method of claim 1 wherein said pattern is comprised of a plurality of continuous parallel lines, said lines having preselected widths and conductivities and gap spacings.

5. The method of claim 4 wherein the forming step is carried out by forming the layers of the sheet material into a honeycomb type cellular core material having hexagonal cells, said hexagonal cells defining an open interior and orthogonal L, W and T directions, said T direction coaxial with said first principal axis and passing axially through the open interior, said L direction coaxial with said second principal axis and oriented generally parallel to the sheet material and the W direction coaxial with said third principal axis and oriented generally perpendicular to the sheet material.

6. The method of claim 5 wherein the lines are generally parallel to the L direction.

7. The method of claim 5 wherein the lines are generally parallel to the T direction.

8. The method of claim 1 wherein the forming step is carried out by forming the layers of the sheet material into a honeycomb type cellular core material having hexagonal cells, said hexagonal cells defining an open interior and orthogonal L, W and T directions, said T direction coaxial with said first principal axis and passing axially through the open interior, said L direction coaxial with said second principal axis and oriented generally parallel to the sheet material and the W direction coaxial with said third principal axis and oriented generally perpendicular to the sheet material.

9. The method of claim 8 wherein the hexagonal cells are defined as follows:
sizing each of two opposite sides as length X;
sizing each of the other four sides as length $Xe^{0.5}$; and
forming the included angles between first and second adjacent sets of said other four sides as $2.3\pi$.

10. The method of claim 6 wherein said pattern is comprised of a grid of first and second sets of spaced-apart, continuous parallel lines intersecting generally at right angles to one another, said first set of parallel lines having a first line width and a first line conductivity and said second set of parallel lines having a second line width and a second line conductivity.

11. The method of claim 10 wherein the applying step includes the step of aligning the first set of parallel lines with the L direction and the second set of parallel lines with the T direction, said first and second sets of parallel lines creating repeating unit cell lengths in the T and L directions respectively.

12. The method of claim 11 wherein the first and second sets of parallel lines have equal line widths and equal conductivities, and the unit cell length in the L direction is about 2 to 2.5 times the unit cell length in the T direction in order to create the cellular core material which exhibits approximately twice the conductivity for an electric field aligned in the L direction compared to the electric field aligned in the T direction.

13. The method of claim 1 wherein said pattern is comprised of first and second sets of parallel, spaced-apart grid elements oriented transversely to one another, the first and second sets of grid elements having preselected widths and conductivities.

14. The method of claim 13 wherein the sets of grid elements are approximately perpendicular to one another.

15. The method of claim 13 wherein the widths of the grid elements are varied according to the desired conductance of the grid elements.

16. The method of claim 13 wherein the thicknesses of the grid elements are varied according to the desired conductance of the grid elements.

17. The method of claim 16 wherein the thickness of the first set of grid elements is thicker than the second set of grid elements.

18. The method of claim 1 wherein said pattern is comprised of an array of unit cells, each said unit cell having a chosen pattern of said electrically conductive material, said chosen pattern such that the electrically conductive material in one said unit cell does not contact the electrically conductive material in an adjacent unit cell.

19. The method of claim 18 wherein said chosen pattern has an undulating shape.

20. The method of claim 1 wherein said electrically conductive material includes finely divided carbon suspended within a carrier fluid.

21. The method of claim 1 wherein said applying step is carried out using a rotogravure process.

* * * * *